United States Patent

[11] 3,630,561

| [72] | Inventor | Jacob Pieter Schuler<br>Beatrixlaan 21, Soest, Netherlands |
| --- | --- | --- |
| [21] | Appl. No. | 48,582 |
| [22] | Filed | Apr. 28, 1970 |
| [45] | Patented | Dec. 28, 1971 |
| [32] | Priorities | Apr. 29, 1968 |
| [33] | | Netherlands |
| [31] | | 6806080; |
| | | Nov. 18, 1968, Netherlands, No. 6816396<br>Original application Apr. 28, 1969, Ser.<br>No. 819,667. Divided and this application<br>Apr. 28, 1970, Ser. No. 48,582 |

[54] SUCTION CUP STRUCTURE
3 Claims, 6 Drawing Figs.

| [52] | U.S. Cl. | 294/65 |
| --- | --- | --- |
| [51] | Int. Cl. | A47b 97/00,<br>B66c 1/02 |
| [50] | Field of Search | 294/64, 65 |

[56] References Cited
UNITED STATES PATENTS

| 3,351,370 | 11/1967 | Olson | 294/64 |
| --- | --- | --- | --- |
| 3,387,718 | 6/1968 | Roth | 294/64 |

*Primary Examiner*—Harvey C. Hornsby
*Attorney*—Prangley, Clayton, Mullin & Vogel ABSTRACT: A suction cup structure for use in a lifting device to lift structural building elements, which is to be connected to a vacuum source and comprises a rubber sealing ring mounted in a circular groove around the opening of the suction cup, the configuration of which cup conforms to the relevant surface portion of the object to be lifted, said ring consisting of a plurality of layers of foam rubber succeeding each other from the inside to the outside about the opening of the cup, said layers being separated from each other by impenetrable layers of glue interconnecting the rubber layers.

INVENTOR
JACOB PIETER SCHULER
ATTORNEYS

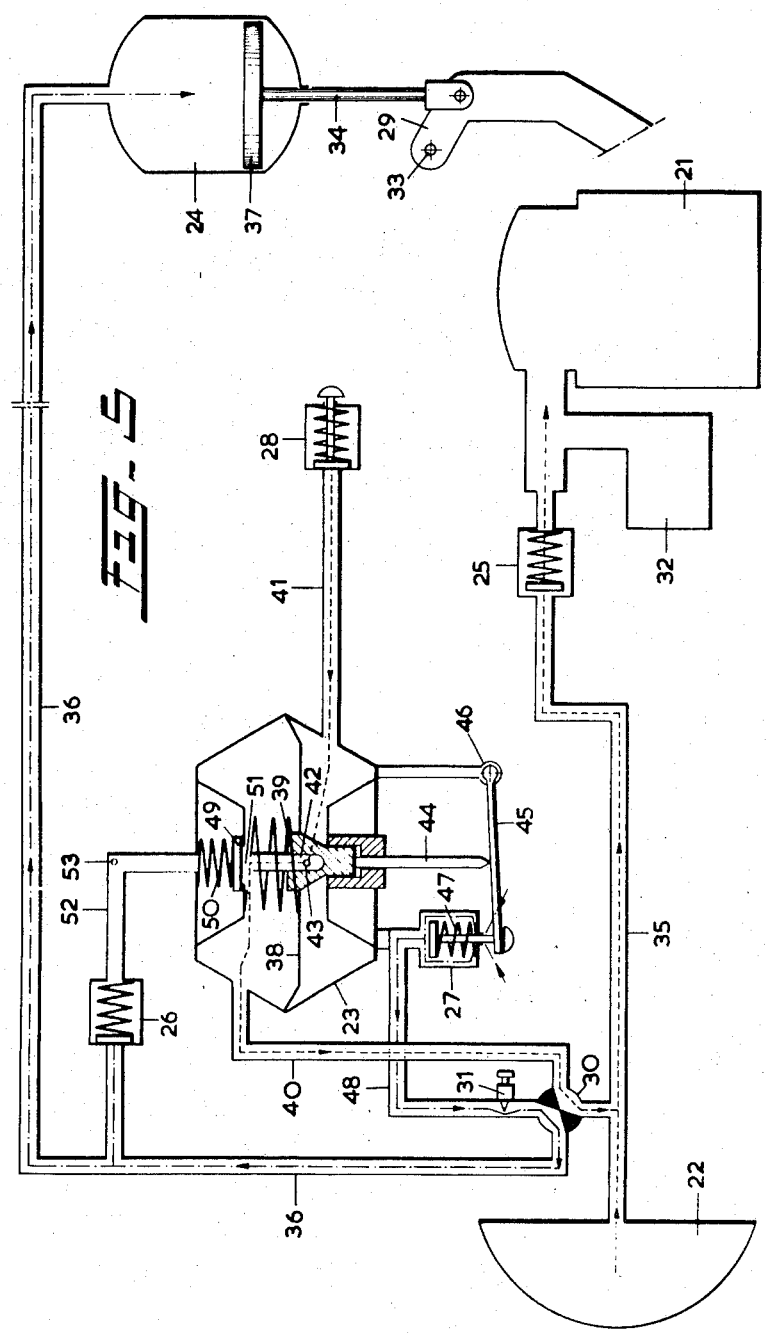

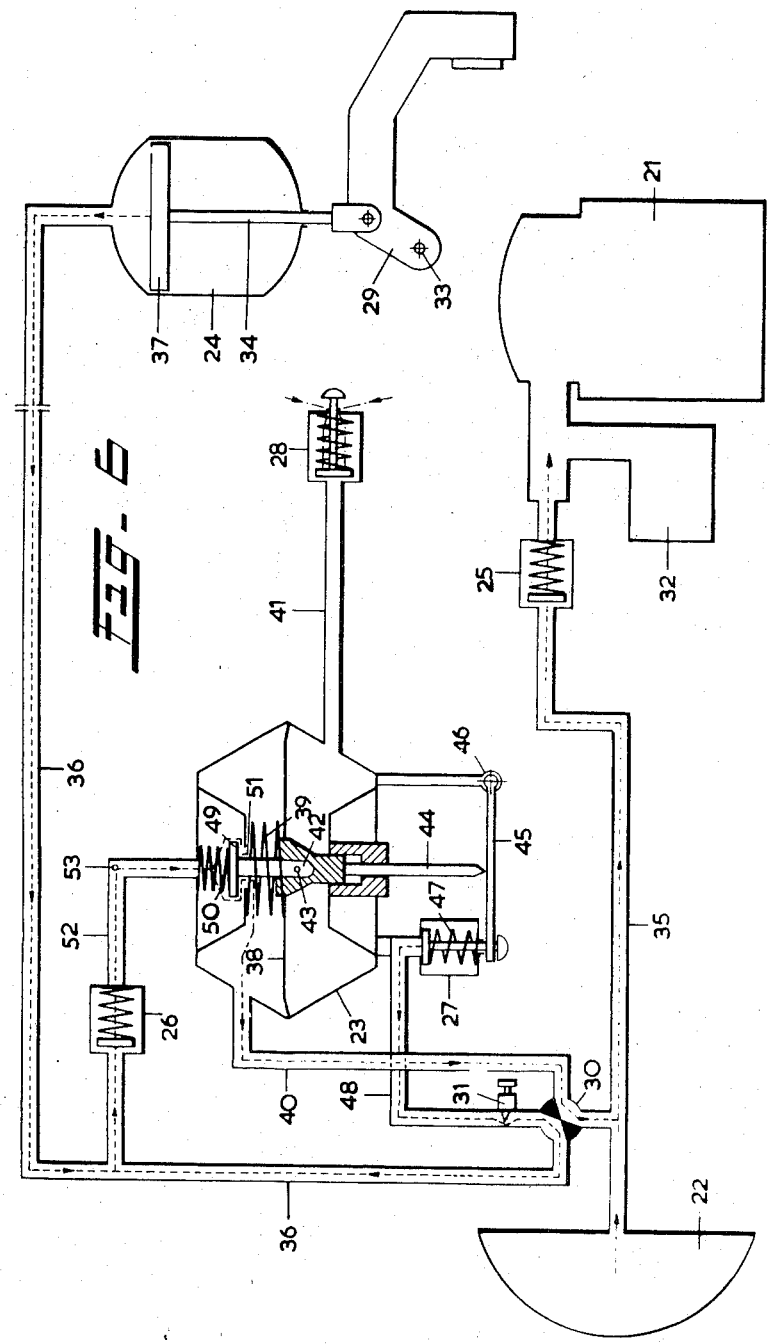

SUCTION CUP STRUCTURE

This application is a division of application Ser. No. 819,667 filed Apr. 28, 1969, now U.S. Pat. No. 3,578,372.

The present invention primarily relates to a suction cup structure for use in a crane or similar lifting device comprising a vacuum source, and adapted to lift structural building elements or like proportionally heavy objects of particularly concrete, steel and Eternit, the suction cup on the one hand comprising a connection to be connected to the vacuum source and on the other hand a rubber ring mounted in a circular groove around the opening of the suction cup so as to project with its free end edge from said groove to effect a sealing connection with a surface portion of the object to be lifted.

It is well-known to use a suction cup structure of this type for lifting sheets or similar objects, and particularly so when difficulties are encountered in passing such provisions as slings under the objects and when it is advantageous to have the lifting force exerted on a somewhat enlarged surface portion in view of the poor rigidness of those objects. In it, the rubber ring is homogeneously formed out of rubber of a relatively rigid quality. In this known structure, however, it is necessary for the surface portion to which the rubber ring of the suction cup engages if perfectly smooth, even and plane. Besides, when these known suction cup structures are employed, utmost care should be taken that the surface portion to be engaged is clean, because the lifting and the transport by means of this known suction cup structure would otherwise be too risky.

It is an object of this invention to provide a suction cup structure of the type described in the opening passages of this specification, wherein the object to be taken up need not have a perfectly smooth and even, and specially not a plane surface portion for it to be engaged, and nevertheless a very firm hold is secured in lifting and transportation by the safe maintenance of the vacuum to be created in the interior of the suction cup. Also, objects which have never allowed of being lifted or transported in this manner, such as particularly concrete pipe sections, can now be lifted and displaced in a safe, fast and simple manner. A vacuum gauge safety device known per se ensures that inadequate or dropping vacuum is seen at once.

To this effect a suction cup structure of this type is characterized, according to the present invention, in that sealing ring of the suction cup, the configuration of which conforms to the relevant surface portion of the object, consists of a plurality of layers of foam rubber succeeding each from the inside to the outside about the opening of the suction cup, said rubber layer layers being separated from each other by impenetrable layers of glue interconnecting said rubber layers.

It has surprisingly been found that by means of foam rubber material which has hitherto been held unsuitable for the purpose on account of its porosity and its comparatively softly elastic characteristics an assembly is obtained which is highly suitable to this end as a result of the proposed use of the rubber in concentric layers with layers of glue thereinbetween separating the successive layers of rubber from each other, firmly connecting said layers one to the other and, accordingly, extending transverse to the relevant surface portion of the object, which assembly on the one hand is capable of effecting also a good connection with the comparatively rough surfaces, such as the surfaces of concrete objects which have not been given a special treatment, and on the other is sufficiently strong and impermeable.

In addition, when the assembly is used for lifting and transporting concrete pipe sections for, say, a system of sewage pipes, the suction cup particularly has, according to the invention, a curved configuration conforming to a region of the outer surface of the pipe, which extends over a specific, arcuate peripheral portion of the pipe section. Whereas hitherto, in time-consuming manual operations, dogs or other auxiliary means had to be inserted into or through the pipe sections, or strings had to be passed under them, the suction cup structure according to this invention can be used to transport a pipe section direct to its appropriate location and accurately maneuver it to its right position much faster and with less manpower than previously. Further saving of labor is possible, because the pipe section to be mounted can also be pressed against the completed part of the piping system by crane or like lifting device with a considerable force. Hitherto this has been done, for example, by means of winches, which required considerable manpower and time.

Further, according to this invention, the rubber ring may consist of at least three layers of foam rubber of a thickness of 1.6–2 cm. and a height of 6–8 cm. In this embodiment, and particularly if, in addition, according to a further characteristic of this invention, the layers of the rubber ring are made of natural rubber and for the layers of glue a glue consisting of two components is used, it is possible for concrete pipe sections of a very large size and of a weight of up to 10 tons each and more to be lifted and displaced quickly, efficiently and absolutely safely. Preferably, two aligned suction cup structures of this kind are used to engage the upper side of the pipe section in axial direction thereof.

The present invention further relates to a method of laying down a pipeline consisting of concrete or like pipe sections, using a crane comprising a suction cup structure of the type described hereinbefore, the sections fed by means of the suction cup structure and suspending therefrom being tightly pressed against the completed part of the piping by stop means forming part of the crane and being active against the free end of the pipe section, said stop means being firmly connected to the suction cup structure.

Furthermore, the present invention relates to a pipeline laid down by using this method.

In laying down pipelines consisting of concrete pipe sections by means of the invented suction cup structure a saving of at least 40 percent can be realized. Moreover, when the invented suction cup structure is applied, there is no danger of strings getting loose, so that the safety in operations is greater than with the method found hitherto. Also, the invented structure allows of more accurate manipulation with the sections or other objects than before.

A further advantage not to be neglected is that, according to this invention, concrete pipe section can be transported earlier than before, so when the concrete is still comparatively fresh.

The present invention also relates to a safety device used in a takeup device, like particularly a suction cup structure of the type described above, which is operative under a vacuum coming from a source of vacuum, which safety device comprises a receiving member to be brought into or under the object taken up and adapted on the one hand to prevent the lifted object, when this would be at a dangerous height above the ground or the floor, from falling down owing to an involuntary dropping of the vacuum, but on the other hand to be moved from below or from within the object without this calling for a separate source of power before the object is put down by the takeup device.

To achieve this, a safety device according to the invention is characterized in that the receiving member forms part of an auxiliary system which is connected to the source of vacuum such that the receiving member is retained in its inoperative position by the vacuum, is released from that inoperative position by aeration of at least part of the auxiliary system when the takeup action by means of the vacuum is started, and is returned to its inoperative position by that vacuum upon operation of a control member included in the auxiliary system, while retaining the activity of the vacuum for taking up the object. Thus, by making use of the vacuum of the takeup device as a source of power, no additional source of power is required for the safety device, and as a result of the coupled connection between the control device for releasing the receiving member from its inoperative position and the device for activating the taking up of the object it is ensured that the receiving member will occupy its operative position when the takeup device is in operation.

In a further elaboration of the principle according to this invention, the auxiliary system may comprise a conduit extending from the vacuum source to a vacuum lifting cylinder and including a valve for setting an open connection between this cylinder and either the vacuum source of an air conduit, which valve is coupled to the device for activating the taking up of an object, the control device for causing the receiving member to return to its inoperative position being active on a conduit of the auxiliary system, connecting the vacuum source with the cylinder in the last-mentioned position of the valve.

In it, the valve is preferably a multiway valve with a first branch of the conduit of the auxiliary system extending therefrom toward the first side of the diaphragm loaded by a compression spring and having a passage provided therein, and into a diaphragm valve space to which, on the other side of the diaphragm, is connected an aeration valve forming the said control device for the return movement of the receiving member and being normally in sealed condition by the action of a spring, while, with the diaphragm being deflected under the action of the compression spring, wherein the passage in the diaphragm is open, a second branch of the conduit of the auxiliary system, which is connected to the diaphragm valve space on the fist side of the diaphragm and is provided with a small leakage passage, and which is connected to the conduit extending from the multiway valve to the lifting cylinder, is shut off by a spring-loaded valve which is opened upon operation of the control device by the diaphragm moving against the action of the compression spring, as the diaphragm passage is being closed, an aeration valve at the end of the air conduit moving from its open to its closed position under the action of a spring.

When the object taken up has practically reached its destination, it will thus be sufficient to operate the control device in the auxiliary system, i.e. the aeration valve, as a result of which the receiving member is moved to its inoperative position by the vacuum active by way of the diaphragm valve and the branch provided with the nonreturn valve and starting from said diaphragm valve. When, after the object taken up has been put down at its destination, the takeup vacuum is eliminated, the connected valve, too, so the multiway valve in the auxiliary system, is therefore so adjusted as to cause the vacuum for the lifting cylinder of the receiving member to come direct from the multiway valve again. Owing to presence of the leakage passage in the said branch, the pressure difference existing on both sides of the diaphragm in the diaphragm valve space is then gradually eliminated, and the diaphragm, by virtue of the compression spring acting thereon, takes up its deflected position again as desired for a next takeup cycle, the aeration valve at the end of the air conduit being opened.

To ensure that, after the takeup device has been actuated, the receiving member only reaches its active receiving position after a controllable delay, there may be provided, according to a further embodiment of this invention, an adjustable throttle valve connected in the air conduit connected to the valve.

The invention will now be illustrated with reference to the accompanying drawings, showing diagrammatically an embodiment of a suction cup structure as well as a safety device according to the present invention. In the drawings:

FIG. 5 shows the situation when the takeup device is in operation, with receiving member swung down in its actively safeguarding positions; and FIG. 6 shows the situation when the takeup device still operates, but the receiving member is no longer in its safeguarding position.

Figure 1:
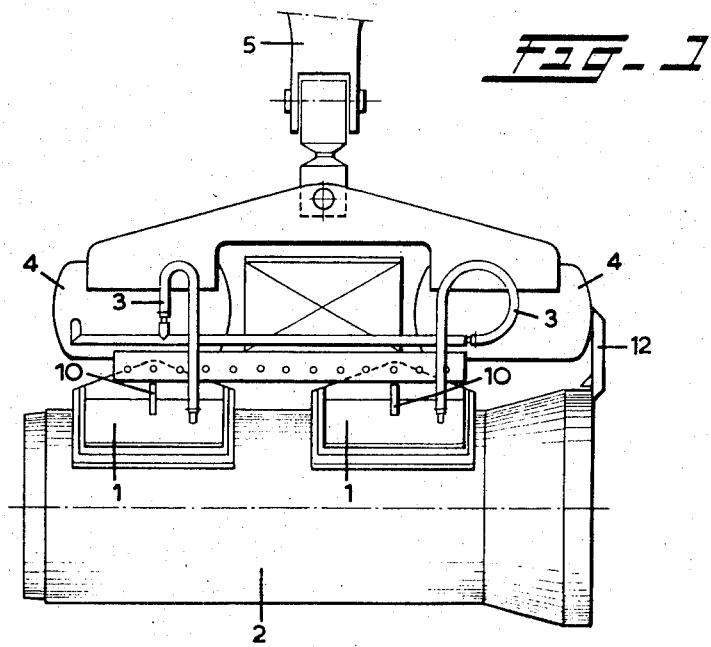
FIG. 1 is a side elevation of two suction cup structures mounted on a crane and being in engagement with a pipe section for a concrete sewage pipeline.
Figure 2:
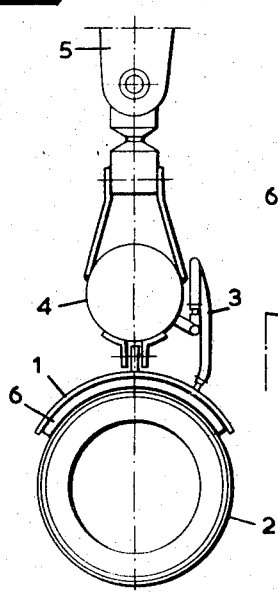
FIG. 2 is a front elevation for a pipe section lifted in this manner.
Figure 3:
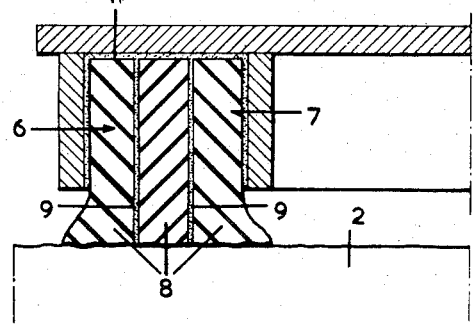
FIG. 3 is a diagrammatic cross-sectional view, on an enlarged scale, of a detail of a suction cup sealing ring received in a recessed groove of a suction cup.

Referring to FIGS. 1-3, two interconnected suction cups 1 of a cylindrical configuration conforming to a peripheral surface portion of a sewage pipe section 2 which is to be displaced are secured to the arm 5, partly shown in the drawing, of a pull crane. The suction cups are each reinforced by a rib 10 and connected to a vacuum source 4 by way of a line 3.

As seen in axial direction of the pipe section, the two suction cups are disposed one behind the other. They each contact a peripheral outer surface portion of the concrete, as this has come off the pipe mould in a rough form, extending symmetrically of the vertical plane through the axis of the pipe section, by means of a rubber ring 6. At 11 this ring is glued to some depth in a peripheral groove 7 of rectangular cross section of the suction cup 1 by means of a suitable adhesive consisting of two components.

The rubber ring 6 is built up of three layers 8 of natural foam rubber, which are of the same height and are disposed edgewise. The layers 8 are united by means of layers 9 of glue consisting of two components and applied between each of said rubber layers in a direction transversely of the concrete surface to be contacted, the rubber and glue unit projecting from the groove for some distance. The two-component glue layers 9 form impenetrable partitions between the successive layers of foam rubber which, in the embodiment shown, are 1.8-cm. thick and 7-cm. high.

A vacuum gauge safety, not shown, which is connected to the vacuum source 4, gives a warning signal if the vacuum is insufficient or drops.

Experiments in actual practice have shown that the construction described is suited to lift and transport safely concrete pipe sections of a weight of up to 10 tons. In the case of high-level transportation above the ground and/or over vulnerable objects, the crane may temporarily be provided, if desired, with additional auxiliary means extending below or through the pipe section to avoid any risks.

Generally, transportation takes place just above ground level in excavations. As a result of the good maneuverability because of the firm hold of the suction cups, the distance between the object to be transported and the ground can be small.

Reference numeral 12 in FIG. 1 denotes a stop member connected with the suction cups 1. By means of this stop member the pipe section transported to its destination can be firmly pressed by the crane against the finished part of the pipeline.

FIG. 3 shows diagrammatically how the end edge of the composite natural rubber ring, which is in engagement with the concrete surface, is deformed owing to the clamping effect of the suction cup under the influence of the vacuum created in the suction cup.

Figure 4:
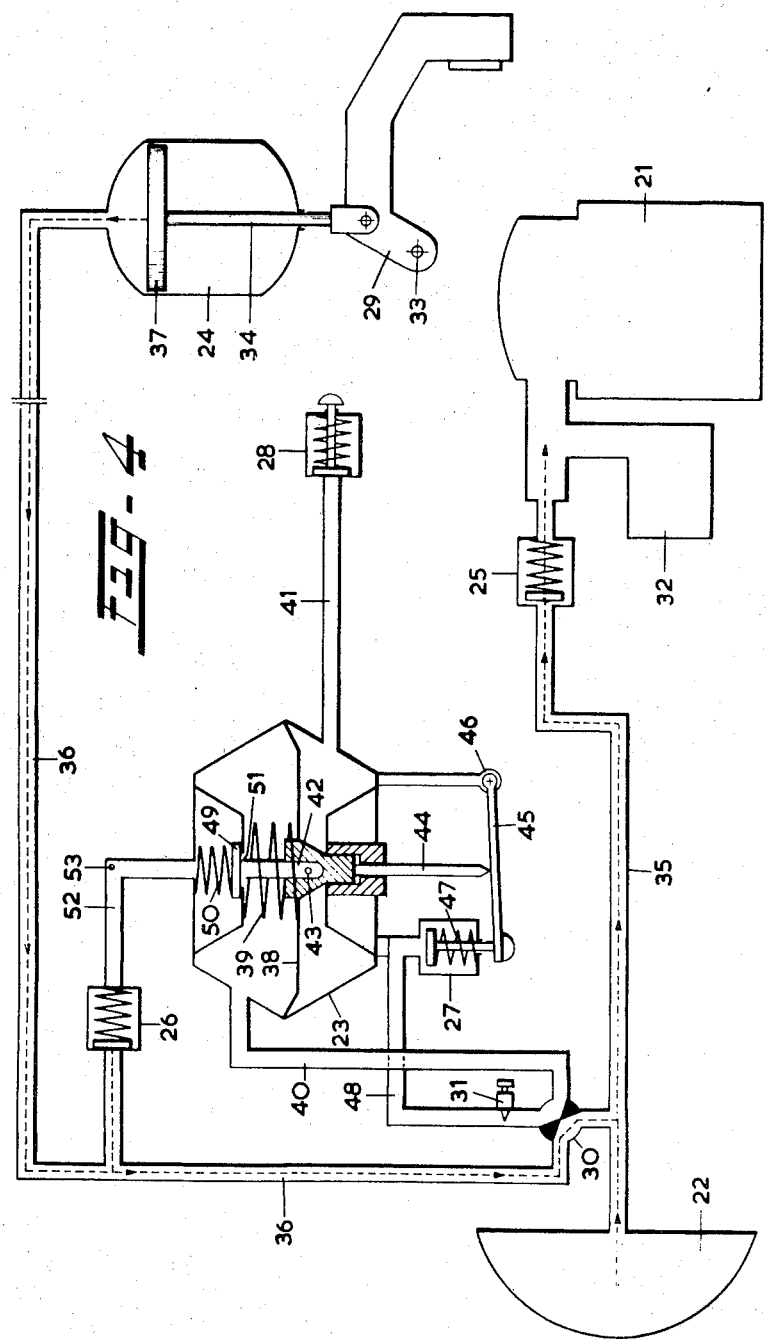
FIG. 4 shows the situation before the takeup device, which, for example, consists of suction cups, is actuated to take up a pipe section, and before the receiving member is operative.

FIGS. 4–6 show the portions of the auxiliary system that are each under a vacuum by means of dotted lines in the middle of the relevant conduit portions and members, and with the arrows pointing in the direction of the vacuum source. The aerated portions are shown in chain-dotted lines, with arrows pointing away from the outside air.

Referring to the drawings, 21 is a vacuum pump and 32 a main supply tank connected thereto for the vacuum required for the suction cups. 22 is an auxiliary supply tank for the safety device, 35 a conduit extending from the main tank to the auxiliary tank, 25 a nonreturn valve in said conduit 35 just beyond the main tank, and 30 a multiway valve coupled to the actuating device for the vacuum from the main tank for the suction cups, such that said valve 30 takes a position as shown in FIGS. 5 and 6 when the takeup vacuum is active and a position as shown in FIG. 4 wen the vacuum is inactive. The dotted lines and the chain-dotted lines, together with the arrows shown in the branches connected to said multiway valve, indicate the open through-connections in those positions. 24 denotes a lifting cylinder connected with the multiway valve 30 by way of a conduit 36 and keeping a receiving hook in its inoperative position, as is shown in FIGS. 4 and 6, by the vacuum above a piston 37 in that lifting cylinder 24. FIG. 5 shows the hook 29, in the safeguarding receiving position into which it has swung by its own weight about the swivel bearing 33, with the hook end extending into a concrete pipe, not shown in the drawings, and with the conduit 36 being aerated. The piston rod 34 connects piston 37 with hook 29.

Connected to a diaphragm valve 23 with diaphragm 38, on which a compression spring 39 is active downwards, as seen in the drawings, and above the diaphragm is a conduit 40 coming from the valve 30, and below the diaphragm an air conduit 41 extending to a manually operable spring-urged aeration valve 28. Projecting above the diaphragm is a tubular member 42 connected with said diaphragm and open at the top, which member is sealed at the bottom, except for an aperture 43 opening up into the space below the diaphragm 38. Furthermore the diaphragm has firmly connected thereto a downwardly extending punch 44 the bottom end of which is in abutment with a strip 45 which at one end has a fixed point of swivel at 46 and at the other end is supported on an aeration valve 27, and which, when the diaphragm 38 is deflected by the action of compression spring 39, keeps this valve open against the action of a comparatively weak holddown spring 47 acting on the valve 27. The valve 27 is provided at the end of an air conduit 48 originating from the multiway valve.

With sufficient superatmospheric pressure below the diaphragm as compared with the space thereabove to overcome the resilience of spring 39, which condition is shown in FIG. 6 and manifests itself after operation of the aeration valve 28, the open top of the tubular member 42 strikes the underside of a valve member 49, while shutting off that top, which valve member 49 has sealed off before, under the action of a spring 50, a passage 51 at the top of the diaphragm valve space to a conduit 52. So the open connection between the two spaces on both sides of the diaphragm by way of aperture 43 and tubular member 42, as shown in FIGS. 4 and 5, is interrupted. Connected in conduit 52, which at its other end terminates into conduit 36, is a spring-urged nonreturn valve 26 which is then opened by the vacuum originating from conduit 40 by way of the diaphragm valve 23, so that the vacuum via this route becomes active on piston 37 of the lifting cylinder 24. This vacuum cannot be disturbed by the air conduit 48, which also communicates with conduit 36 by way of valve 30, because the aeration valve 27 has meanwhile been closed by spring 47 as the diaphragm 38 with the punch 44 moved up.

If in this condition, on account of the suction cups being disengaged, the multiway valve 30 is moved back to the position shown in FIG. 4, the initial condition shown in FIG. 4 sets again owing to the entry of air through a leakage passage 53 provided in conduit 52.

The throttle valve 31 in the air conduit 48 ensure that, when the takeup device is actuated, i.e. the change from the condition shown in FIG. 4 to that shown in FIG. 5, the aeration of the cylinder 24 above the piston 37 is delayed (FIG. 5), so that the hook 29 swings down only slowly to its actively safeguarding position. Thus the risk of the hook not swiveling safely into the pipe but striking the top of the pipe before the suction cups have been activated is reduced.

It will be understood that numerous modifications and variants of the embodiments of the suction cup structure and the safety device as described above are possible, without departing from the scope of this invention.

I claim:

1. A suction cup structure for use in a crane or similar lifting device comprising a vacuum source, and adapted to lift structural building elements of like proportionally heavy objects of particularly concrete, steel, and Eternit, the suction cup on the one hand comprising a connection to be connected to the vacuum source and on the other hand a rubber ring mounted in a circular groove around the opening of the suction cup so as to project with its free end edge from said groove to effect a sealing connection with a surface portion of the object to be lifted, wherein the sealing ring of the suction cup, the configuration of which conforms to the relevant surface portion of the object, consists of a plurality of layers of foam rubber succeeding each other from the inside to the outside about the opening of the suction cup, said rubber layers being separated from each other by impenetrable layers of glue interconnecting said rubber layers a safety device suction takeup device, such as a suction operative under a vacuum originating from a source of vacuum, said safety device comprising a receiving member to be brought into or under the object taken up wherein said receiving member forms part of an auxiliary system which is connected to the source of vacuum such that the receiving member is retained in its inoperative position by the vacuum, is released from that inoperative position by aeration of at least part of the auxiliary system when the takeup action by means of the vacuum is started, and is returned to its inoperative position by that vacuum under operation of a control member included in the auxiliary system, while retaining the activity of the vacuum for taking up the object.

2. A safety device as claimed in claim 1, wherein the auxiliary system comprises a conduit extending from the vacuum source to a vacuum lifting cylinder and including a valve for setting an open connection between said cylinder and either the vacuum source or an air conduit, which valve is coupled to the device for activating the taking up of an object, the control device for causing the receiving member to return to its inoperative position being active on a conduit of the auxiliary system, connecting the vacuum source, with the cylinder in the last-mentioned position of the valve.

3. A safety device as claimed in claim 2, wherein the valve is a multiway valve with a first branch of the conduit of the auxiliary system extending therefrom toward the first side of the diaphragm loaded by a compression spring and having a passage provided therein, and into a diaphragm valve space to which, on the other side of the diaphragm, is connected an aeration valve forming the said control device for the return movement of the receiving member and being normally in sealed condition by the action of a spring, while with the diaphragm being deflected under the action of the compression spring, wherein the passage in the diaphragm is open, a second branch of the conduit of the auxiliary system, which is connected to the diaphragm valve space on the first side of the diaphragm and is provided with a small leakage passage, and which is connected to the conduit extending from the multiway valve to the lifting cylinder, is shut off by a spring-loaded valve which is opened upon operation of the control device by the diaphragm moving against the action of the compression spring, as the diaphragm passage is being closed, an aeration valve at the end of the air conduit moving from its open to its closed position under the action of a spring.

* * * * *

UNITED STATES PATENT OFFICE
CERTIFICATE OF CORRECTION

Patent No. 3,630,561          Dated December 28, 1971

Inventor(s) JACOB PIETER SCHULER

It is certified that error appears in the above-identified patent and that said Letters Patent are hereby corrected as shown below:

Column 2, line 5, after "by" insert --a--;

Column 2, line 39, "manipulation" should be --manipulations--;

Column 3, line 23, "fist" should be --first--;

Column 6, line 18, "suction takeup device, such as a suction" should be deleted.

On the cover sheet insert -- [73] Assignee Handelmaatschappij "Othene" N. V. --.

Signed and sealed this 13th day of June 1972.

(SEAL)
Attest:

EDWARD M. FLETCHER, JR.
Attesting Officer

ROBERT GOTTSCHALK
Commissioner of Patents